United States Patent
Linsen et al.

[15] 3,673,115
[45] June 27, 1972

[54] CATALYSTS

[72] Inventors: Bastiaan Gerardus Linsen, Maasland; Theo Jan Osinga, Vlaardingen, both of Netherlands

[73] Assignee: Lever Brothers Company, New York, N.Y.

[22] Filed: Dec. 30, 1969

[21] Appl. No.: 889,290

[30] Foreign Application Priority Data

Dec. 30, 1968  Luxembourg..............................57.716

[52] U.S. Cl. ..........................................................252/459
[51] Int. Cl. .........................................................B01j 11/22
[58] Field of Search..................................................252/459

[56] References Cited

UNITED STATES PATENTS

| | | |
|---|---|---|
| 1,232,830 | 7/1917 | Morey et al............................252/459 |
| 1,280,314 | 10/1918 | Schwarcman..........................252/459 |
| 1,375,368 | 4/1921 | Drucker et al..........................252/459 |
| 1,695,666 | 12/1928 | Schirmacher et al...................252/459 |
| 1,783,662 | 12/1930 | Marx et al..............................252/459 |
| 2,381,198 | 8/1945 | Bailey et al. ...........................252/459 |

*Primary Examiner*—Daniel E. Wyman
*Assistant Examiner*—W. J. Shine
*Attorney*—Louis F. Kline, Jr., Melvin H. Kurtz and Edgar E. Ruff

[57] ABSTRACT

In a process for the preparation of a nickel-on-silica catalyst, the use of an intimate mixture of an organic base, which base is substantially insoluble in the suspension of silica in aqueous nickel salt solution, as a means of withdrawing hydrogen ions from the solution and causing precipitation of nickel from the solution on to the silica carrier.

10 Claims, No Drawings

CATALYSTS

The invention relates to a process for the preparation of nickel-on-silica catalysts, as well as to catalysts prepared by this process.

Nickel-on-silica catalysts have been known in the art for many years. They are applied in numerous hydrogenation reactions, their application in the catalytic hydrogenation of fatty products, such as fatty alcohols, fatty acids and fatty acid esters, in particular triglycerides containing one or more double bonds, being particularly important. It has been recognized that the effectiveness of such catalysts is dependent on a number of different properties, such as activity, resistance to poison, resistance to sintering and selectivity.

If the catalyst is to possess a high activity, it is desirable for the catalyst to have a large specific metal surface (surface per unit of weight of the catalyst), which is easily accessible to the reaction components. This is the case when the catalytic agent is evenly distributed over all the surfaces of the carrier material in the form of very fine particles or as a thin layer.

The amount of catalyst used during a certain reaction is dependent on the degree to which the catalyst is inactivated by the deposit of undesired substances from the reaction medium on the surface of the catalyst, and it will be clear that this resistance to poison is largely determined by the specific surface of the catalyst.

In many cases these catalysts will be subjected to a high temperature, either before use in an activation process and/or during their use in a catalytic process and/or in regenerating them after us in such a process, and it is therefore of importance for them to be stable under such conditions.

The resistance to sintering is in the first place dependent on the type of catalytically active agent and on the carrier material used, but it is also influenced by the way in which the catalyst is prepared.

With such nickel-on-silica catalysts the activity is also dependent on the amount of metal compound that will be reduced during the activation process. This amount is in the first place dependent on the physical and chemical condition in which the metal is present on the carrier surface. Moreover the resistance to sintering again plays an important part in this connection. For in general the degree of reduction to be achieved will be higher as the reduction is carried out at a higher temperature. With catalyst masses which have a great resistance to sintering and which therefore can be reduced at relatively high temperatures, a higher degree of reduction will be attained than with catalyst masses showing a less high resistance to sintering.

Alternatively, most problems regarding sintering can be avoided, if it is possible to prepare compositions which can be reduced completely, or at least to a high degree, at a relatively low temperature.

With various catalytic processes it is of importance for the catalysts used to have a great selectivity. Thus in hydrogenation processes in which two or more double bonds are successively hydrogenated, it is important that the hydrogenation can be carried out stepwise, so that partly hydrogenated compounds can be prepared without higher saturated compounds being formed. Such a selectivity is in the first place dependent on the nature of the catalytically active agent. Thus nickel in the above-mentioned hydrogenation of triglyceride esters of unsaturated fatty acids has a so-called "oleic acid" selectivity, which means that the polyunsaturated fatty acids, such as linolenic acid and linoleic acid, can be hydrogenated to mono-unsaturated acids (in this case oleic acid) without the latter being appreciably further hydrogenated to the completely saturated fatty acid (stearic acid). This selectivity can be promoted still further by a proper choice of the reaction conditions. Further this selectivity is also dependent on the structure of the silica containing carrier material. In general it increases with the pore size of the carrier material and preferably catalyst carrier will be used in this reaction of which the greater part of the pores has a diameter of at least 25 A, preferably even of at least 80 A. In other hydrogenation reactions, e.g. the hydrogenation of free fatty acids, carrier material with narrow pores appears to be favorable.

In the preparation of the above-mentioned catalysts it is of importance to use such a process that one starts from carrier material with the desired pore size and that during the processes used this pore structure is retained as much as possible.

Finally it should be observed that with most industrial processes it is important for the catalyst to be recovered in a simple way. For this reason catalysts applied in wet processes should possess good filtration properties, so that they can be separated from the reaction medium by simple filtration or centrifugation.

In the literature a large number of methods has been described for the preparation of such supported nickel catalysts.

In a very simple process the nickel is precipitated in the form of an insoluble compound, such as an oxide, hydroxide, carbonate, basic carbonate and the like, from an aqueous solution of one of its salts by adding to a solution an aqueous solution of a basic compound, such as alkali hydroxide or carbonate, or ammonia. In this connection it has been found that, in order to precipitate the insoluble compound in a suitable form, the precipitation reaction should take place at relatively high temperatures, preferably between 90 and 100° C. The precipitate formed is subsequently filtered off and, if necessary after drying, intimately mixed with the carrier material, after which the mass obtained is activated. It is clear that, as far as the catalytically active agent will still be attached to the carrier material in this process in a later stage, this attachment takes place mainly on the external surface and only to a slight degree on the internal surface of the pores. Attempts have been made to overcome this disadvantage by precipitating the metal in the presence of the carrier, but under these circumstances only a part of the insoluble compound is precipitated on the carrier material, and of that the main part is precipitated on the external surface. The latter method moreover has the disadvantage that during precipitation the carrier material is exposed to the influence of the hot alkaline solution, which with the use of silica as carrier material results in a deterioration of the surface structure.

It has been found that the above-mentioned processes, particularly if they are applied on an industrial scale, are in general difficult to control and yield catalysts of varying qualities. True, it is possible to improve this by applying certain measures, by which the carrier mass remains in contact with the hot alkaline solution as briefly as possible, and/or by which the precipitation is carried out at a constant pH, but the previously mentioned disadvantages are only partially removed in this way. Besides, in all the processes mentioned above the desired even distribution of the catalytically active agent over all the surfaces of the carrier material is not or only partially achieved.

In another process the carrier material is impregnated with an aqueous solution of a suitable nickel salt, after which the impregnated mass is dried and subsequently heated to a higher temperature with decomposition of the salt and formation of the metal oxide. Also in this process no even distribution of the catalytically active agent over the carrier material is achieved, because of the diffusion of the dissolved salt to the external surface during drying.

In another process the nickel is precipitated on the carrier material by boiling a suspension of this material in a solution of nickel in ammonia, thus evolving the ammonia while liberating nickel ions, and precipitating the nickel as hydroxide in the form of fine particles over the whole surface of the carrier material, including the internal surface. However, this process has the disadvantage that it is less suitable for alkali susceptible carrier materials such as silica, since the surface thereof is affected under the strongly basic conditions employed.

An object of the invention is to provide a process by which, while avoiding the above-mentioned disadvantages connected with known processes, nickel-on-silica catalysts can be prepared in a simple way, in which the properties discussed above, such as activity, resistance to poison, resistance to sintering, selectivity and good filterability, are very favorably combined.

According to the invention a nickel-on-silica catalyst is prepared by means of a process in which the nickel is precipitated from an aqueous solution of a nickel salt in the form of nickel hydroxide on the carrier material suspended in the solution, after which the solid material is separated from the aqueous solution, if necessary washed and dried and subsequently activated in which process the nickel hydroxide is precipitated on the carrier material by intimately contacting a suspension thereof in an aqueous solution of a nickel salt with an organic base which is substantially insoluble in this solution, thus withdrawing hydrogen ions from this solution and increasing the pH thereof.

It has been found that the nickel-on-silica catalysts prepared according to this invention have several advantages over catalysts prepared by means of the precipitation reactions known from the art and discussed above. These advantages will be discussed in more detail later on. Without wishing to be bound by any theory, it is thought that this might be explained by the fact that there is the following fundamental difference between the precipitation reaction according to the process of the invention and the known precipitation reactions. In these known processes an aqueous solution of an alkaline reacting product, such as an alkali metal hydroxide or carbonate is added to the aqueous solution of the nickel salt. Even if stirring takes place in a very effective way, this results in the formation of a local, very high concentration of hydroxyl ions in the place where the alakline solution contacts the salt solution. As a consequence nickel hydroxide, or another insoluble nickel compound, will be instantaneously precipitated, whether or not carrier material is present in the vicinity. This means that at least part of the insoluble nickel compound is not precipitated on the carrier material at all and/or that the precipitated nickel compound is not distributed homogeneously over the carrier surface. In contrast therewith the pH of the salt solution in the process of this invention is gradually increased in a way identical for the whole solution, avoiding the formation of local high hydroxyl ion concentrations. Consequently also the insoluble nickel hydroxide is only gradually formed, which results in a quicker precipitation thereof on the particles of the carrier material acting as crystallization nuclei than the formation of new crystal nuclei consisting of nickel hydroxide itself.

The organic bases to be used in the process of the invention should be so strong that sufficient hydrogen ions are withdrawn from the aqueous salt solution to attain therein a pH value necessary to precipitate the nickel hydroxide. Preferably primary or secondary alkyl amines are used, of which the alkyl groups comprise altogether at least 8 and preferably 10 to 22 carbon atoms. Examples of such amines are n-octyl amine, n-dodecyl amine, n-octadecyl amine and the like. Particularly good results were obtained when using mixtures of t-alkyl amines which are commercially available under the name of "Primene 81–R" and "Primene J.M.T.," and the t-alkyl groups of which comprise 12 to 14 and 18 to 22 carbon atoms, respectively.

Other examples of organic bases suitable to be used in the process of the invention are alkyl diamines, such as $\alpha\omega$-nonyl diamine and $\alpha\omega$-dodecyl diamine. If desired, the organic base can also be applied in a dissoved form, in which case the solvent should also be substantially insoluble in the aqueous salt solution and should not react with it under the reaction conditions used. The use of such a solvent is especially important if the used organic base is solid at the reaction temperature applied.

In some cases, dependent on factors such as the nature of the nickel salt, concentration of the salt solution, nature of the organic base and reaction temperature, it may happen that the organic base after conclusion of the precipitation reaction remains suspended or even emulsified in the aqueous solution completely or partially together with the solid precipitate, so that difficulties are encountered when isolating the solid substance from the reaction mixture. These difficulties can generally be solved or reduced by adding an organic solvent to the reaction mixture before or after the precipitation reaction. Suitable organic solvents are e.g. benzene, toluene, hexane, petroleum ether, kerosine, ether, di-isopropyl ether, carbon tetrachloride, chloroform or methylene chloride. Of these chloroform gives particularly good results.

In order to effect a precipitation of the nickel hydroxide which is as complete as possible, the proportion of organic base/nickel salt should be at least equal to the stoichiometric proportion, but in general it is preferred to use an excess of the base.

As starting material in the process of the invention any nickel salt can be used that is sufficiently soluble in water. Examples of such salts are nickel chloride, nickel nitrate, nickel acetate and nickel sulphate.

When applying the process on an industrial scale, the latter salt is preferably used on account of economic considerations.

It has, however, appeared that when using concentrated solutions of this salt, e.g. if these contain more than 5 percent by weight of nickel sulphate (calculated as $NiSO_4 \cdot 6 H_2O$), after conclusion of the precipitation sometimes difficulties arise in the separation of the solid fraction from the liquid reaction components, in that the organic base attaches itself to the solid material and can only be removed from it with difficulty. It is therefore preferred to start from a nickel sulphate solution of a lower concentration than the concentration mentioned above, although on the other hand, in order to avoid too large volumes, the concentration of this solution should preferably be not less than 1 percent by weight.

With respect to the carrier material it is observed that in principle any silica containing carrier material may be used, although preferably a silica is used with a specific surface between 5 and 750 $m^2/g$. If such catalysts are intended for the selective hydrogenation of triglycerides derived from polyunsaturated fatty acids, it is preferred that the pore structure of this silica is such that a significant part of the pores has a diameter of more than 25 A, preferably more than 80 A.

The precipitation reaction can be carried out at temperatures between the temperature at which all reaction components are either in a liquid or in a dissolved state (usually 0° C or some degrees lower), and the boiling point of the lowest boiling component (aqueous solution or organic solvent). Surprisingly it has been found that in contrast with most of the known processes discussed above, in which the precipitation reaction is preferably carried out at a temperature of 90 to 100° C, the process according to the invention can also very well be carried out at lower temperatures, e.g. 10 to 50° C, preferably at room temperature. This has various advantages. In the first place the surface of the carrier material at otherwise equal pH conditions is much less affected by the alkaline solution at this temperature than at the high temperature normally used. This means that one has a much better control of the specific surface of the finally obtained catalyst as this surface now during the precipitation process does not change and therefore is only dependent on the choice of the starting material. A second advantage of the use of this low temperature is that when precipitating nickel hydroxide on silica at relatively high temperatures, this silica can react under the conditions applied with the precipitated nickel hydroxide. The compounds formed thereby may hamper a subsequent reduction of the nickel compound to metallic nickel, which results in a decreased degree of reduction and as a consequence thereof a reduced activity. By applying higher reduction temperatures the degree of reduction in such cases can indeed be increased, but in this way the risk of sintering is increased. By carrying out the precipitation at lower temperatures, e.g. room temperature, less interaction occurs between the carrier material and the nickel compound precipitated thereon. This appears very clearly from the fact that in the reduction of a composition prepared at this temperature, at a temperature of only about 300° C a degree of reduction of 100 percent is attained, while with compositions prepared according to known processes a reduction temperature of about 450°–500° C is required and the degree of reduction even then often remains considerably below 100 percent. For obtaining such a high degree of reduction it is desirable to prevent the composition from being affected by adhering water during drying. Therefore drying in this case should take place at temperatures that are as low as possible, it being preferred to remove as much as possible, of the adhering water before heating e.g. by washing the composition with a water miscible organic solvent such as acetone, ethanol or similar solvent.

Establishing an intimate contact between the base and the aqueous solution suspension can be achieved by means of any processes which are normally used for intimately mixing mutually insoluble liquids and solids with liquids. Examples of suitable mechanical processes are: stirring, shaking or blowing through with air or other gases. In the process of the invention the mixing process, e.g. stirring, is preferably carried out so vigorously that both the carrier material and the organic base are dispersed in the aqueous solution. This condition is preferably maintained until precipitation of the nickel hydroxide on the carrier material is effected as completely as possible, and this can be checked in a simple way by quantitative or qualitative determination of the nickel ions still present in a sample of the aqueous solution.

The composition obtained after conclusion of the precipitation reaction is finally activated by processes known per se, i.e. that the nickel compound precipitated on the silica is transformed by means of a reduction into metallic nickel. This reduction can, if desired, be applied immediately to the composition obtained, but preferably the composition is first isolated from the reaction medium, washed with water and if desired with an organic solvent such as acetone or ethanol, subsequently dried and, if required, ground. Then the composition thus obtained is reduced at a temperature of 120° to 800° C, preferably 300° to 500° C, by means of hydrogen gas to yield the active nickel-on-silica catalyst, where the nickel is present in finely divided metallic form.

The quality of the catalysts thus obtained will usually rapidly deteriorate upon storage, and they very often have pyrophoric properties. For this reason it is preferred to work up the catalysts, e.g. for storage or with a view to selling, in the form of the non-activated composition and to subject this composition to an activation treatment only immediately before use. It will be clear that the invention also relates to the preparation of these non-activated compositions.

The process will now be illustrated by the following examples:

EXAMPLE A

This example describes the preparation of a nickel-on-silica catalyst by a conventional method, which catalyst is used as a standard in the determination of the "sesame oil activity" of the catalysts mentioned in Table I.

15.4 ml of 3.4 N sodium carbonate were added to a boiling suspension of 20 g of good quality kieselguhr (93.1 percent ash) in 700 ml of distilled water, immediately followed by the simultaneous addition of 400 ml of a 10 percent aqueous solution of nickel nitrate and 400 ml of 3.4 N sodium carbonate. The latter solutions were added at a rate of 2 ml each per minute, while boiling the reaction mixture continuously during the addition. The final mixture was filtered and the filter cake was washed repeatedly with hot water and dried to give a composition having a nickel content of 42.6 percent.

EXAMPLE I

To a stirred suspension of 25 g of a spheric amorphous silica having a specific surface of 200 m$^2$/g in 400 ml of distilled water were added successively a solution of 37.5 g of nickel nitrate (Ni(NO$_3$)$_2$·6 H$_2$ O) in 100 ml of water and 150 ml Primene J.M.T. (a mixture of t-alkylamines haveing 18 to 22 carbon atoms). The suspension obtained was stirred vigorously for 30 minutes at room temperature. Then 150 ml of petroleum ether were added and the mixture was allowed to stand for about 15 minutes. After filtering the filter cake was washed repeatedly with petroleum ether and dried in vacuum at 20° C to give a composition having a nickel content of 16.5 percent. Activation of this composition was achieved by reducing it for 4 hours in a tube furnace at 450° C and in a hydrogen flow at a rate of 36 l/h per g nickel.

EXAMPLE 2

To a stirred suspension of 25 g of a spheric amorphous silica having a specific surface of 200 m$^2$/g in 400 ml of distilled water were added successively a solution of 37.5 g nickel nitrate (Ni(NO$_3$)$_2$·6H$_2$O) in 100 ml water and 150 ml Primene J.M.T. The suspension obtained was stirred vigorously for 30 minutes at room temperature. Then 150 ml of petroleum ether were added and the mixture was allowed to stand for about 15 minutes. After filtering the filter cake was washed repeatedly with petroleum ether and dried for 16 hours at 200° C to give a composition having a nickel content of 18.9 percent. Activation of this composition was achieved by reducing it for 4 hours in a tube furnace at 450° C and in a hydrogen flow at a rate of 36 l/h per g nickel.

EXAMPLE 3

To a stirred suspension of 25 g of a macroporous silica having a specific surface of 320 m$^2$/g in 400 ml of distilled water were added successively a solution of 37.5 g of nickel nitrate (Ni(NO$_3$)$_2$·6 H$_2$O) in 100 ml of water and 150 ml Primene J.M.T. The suspension obtained was stirred vigorously for 30 minutes at room temperature. Then 150 ml of acetone were added and the mixture was allowed to stand for about 15 minutes. After filtering the filter cake was washed repeatedly with acetone and dried in vacuum at 20° C to give a composition having a nickel content of 18.0 percent. The specific surface area of the dried cake was 350 m$^2$/g. Activation of this composition was achieved by reducing it for 1 hour in a tube furnace at 400° C and in a hydrogen flow at a rate of 36 l/h per g nickel. The specific surface of the catalyst was 310 m$^2$/g. The pore size of the silica at the various stages of the process was as follows:

| | | |
|---|---|---|
| macroporous silica | >95% | 50–130 A |
| dried cake | >95% | 50–120 A |
| activated catalyst | >95% | 50–120 A |

Pore size distribution curves for the macroporous silica and activated catalyst indicate, within experimental error, that no change in pore size distribution has occurred.

EXAMPLE 4

To a stirred suspension of 25 g of a macroporous silica having a specific surface of 292 m$^2$/g in 500 ml of distilled water were added successively a solution of 137.2 g of nickel nitrate (Ni(NO$_3$)$_2$·6 H$_2$O) in 200 ml of water and 450 ml Primene J.M.T. The suspension obtained was stirred vigorously for 30 minutes at room temperature. Then 150 ml of acetone were added and the mixture was allowed to stand for about 15 minutes.

After filtering the filter cake was washed repeatedly with acetone and dried in vacuum at 20° C to give a composition having a nickel content of 30.6 percent. Activation of this composition was achieved by reducing it for 1 hour in a tube furnace at 400° C and in a hydrogen flow at a rate of 36 l/h per g nickel.

EXAMPLE 5

To a stirred suspension of 25 g of a microporous silica having a specific surface of 527 m$^2$/g in 400 ml of distilled water were added successively a solution of 37.5 g of nickel nitrate (Ni(NO$_3$)$_2$·6 H$_2$O) in 100 ml of water and 150 ml Primene J.M.T.. The suspension obtained was stirred vigorously for 30 minutes at room temperature. Then 150 ml of acetone were added and the mixture was allowed to stand for about 15 minutes. After filtering the filter cake was washed repeatedly with acetone and dried in vacuum at 20° C to give a composition having a nickel content of 12.7 percent. Activation of this composition was achieved by reducing it for 1 hour in a tube furnace at 300° C and in a hydrogen flow at a rate of 36 l/h per g nickel.

The properties of the various catalysts, or as the case may be, of the compositions from which they were obtained, are shown in Table I:

TABLE I
Properties

| | | | Catalysts | | |
|---|---|---|---|---|---|
| | 1 | 2 | 3 | 4 | 5 |
| Percentage nickel (1) | 16.5 | 18.9 | 18.0 | 30.6 | 12.7 |
| Specific surface area m$^2$g catalyst (2) (d) | 119 | 412 | 251 | 144 | 294 |
| Specific surface area m$^2$/g silica (2) (d) | 214 | 685 | 325 | 321 | 453 |
| Degree of reduction (3) | 75.4 (a) | 57.7 (a) | 96.3 (b) | 100.0 (b) | 100.0 (b) |
| Specific N-surface area m$^2$/g Ni total (4) (e) | 219 | 191 | 187 | 184 | 247 |
| Ni-surface area m$^2$/g catalyst (4) (e) | 36.1 | 36.1 | 33.9 | 56.3 | 31.4 |
| Activity (sesame oil) (A$_s$180) (5) | — | 78% | 118% | — | — |
| Nickel consumption (6) | — | 67% | 36% | — | — |
| Selectivity D$_{30}$ (7) | — | 65 | 20 (b) | — | — |
| Benzene activity (8) | — | 2.02 | 3.67 | — | — | a. Reduced at 450° C
c. Reduced at 300° C
e. Reduced composition
b. Reduced at 400° C
d. Non-reduced composition 1. The percentage nickel is determined before activation of the composition.
2. The specific surface area of the catalyst and its pore size distribution are determined by adsorption of nitrogen at 78° K, cf. S. Brunauer, P.H. Emmett and E. Teller, J. Am. Chem. Soc. 60, 309 (1938), and cf. B.G. Linsen, Thesis Delft (Netherlands) 1964, p. 33.
3. The degree of reduction (ratio reduced nickel/total amount nickel) is obtained by determining the amount of nickel metal after reduction by treating the catalyst with acid, cf. G.B. Linsen L.C., p. 15.
4. The specific surface area of nickel is determined by means of hydrogen chemosorption, c.f. J.W.E. Coenen, Thesis Delft (Netherlands) 1958 and B.G. Linsen, l.c., p. 21.
5. The sesame activity (A$_s$180) is determined, cf. J.W.E. Coenen l.c. and B.G. Linsen l.c. p. 82 by assessing the drop in refractive index on hardening standard sesame oil under standard conditions (175° C and H$_2$ flow of 60 l/h), using such an amount of catalyst that 0.07 percent of nickel, calculated on the oil, is present, using a standard catalyst as reference. Thus:

$$A_s = \frac{\text{drop refractive index with sample} \times 100}{\text{drop refractive index with standard}}$$

In the above experiments the catalyst obtained by reduction of the composition, was prepared as described in Example A.

The nickel consumption is the minimum quantity of nickel necessary to harden a standard whale oil having a sulphur content of 30 p.p.m. under standard conditions (175° C and H$_2$ flow of 60 l/h) until a product is obtained having a refractive index of $n_D^{65}$ = 1.4480 without regard to reaction time.

The selectivity is determined by hydrogenating standard soybean oil under standard conditions (100° C, H$_2$ flow 60 l/h) until a refractive index $n_D^{65}$ = 1.4535 (iodine value of 90) is reached. The standard melting dilatation at 30°C (D$_{30}$) (determined cf. H.A. Boekenoogen "Analysis and Characterization of Oils, Fats and Fat Products", London, New York, Sydney, 1964, Vol.1, p.144) is taken as a measure for selectivity, using a scale varying from D$_{30}$ = 0 — 50 (highly selective) to D$_{30}$>250 (non-selective).

The benzene activity is determined by hydrogenation of gaseous benzene by a known amount of catalyst under standard conditions. The specific reaction rate (=benzene activity) is defined as the number of mmoles benzene converted per minute per gram of nickel.

EXAMPLE 6

To a stirred suspension of 25 g of a spheric amorphous silica having a specific surface of 200 m$^2$/g in 400 ml of distilled water were added successively a solution of 37.5 g of nickel nitrate (Ni(NO$_3$)$_2$·6 H$_2$O) in 100 ml of water and 150 ml Primene J.M.T. in 150 ml kerosine (boiling point 60–90° C). The suspension obtained was stirred vigorously for 30 minutes at room temperature and the mixture was allowed to stand for about 15 minutes. After filtering the filter cake was washed repeatedly with petroleum ether and dried in vacuum at 20° C to give a composition having a nickel content of about 17.5 percent. Reduction of this composition at 400° C in a hydrogen flow gave a nickel-on-silica catalyst having about the same properties as the catalyst obtained in Example 3.

EXAMPLE 7

To a stirred suspension of 20 g of a spheric amorphous silica having a specific surface of 200 m$^2$/g in 250 ml of distilled water were added successively a solution of 30 g of nickel nitrate (Ni(NO$_3$)$_2$·6 H$_2$O) in 300 ml of water and 22 g αω-nonyldiamine in 250 ml of chloroform. The suspension obtained was stirred vigorously for 30 minutes at room temperature and the mixture was allowed to stand for about 15 minutes. After filtering the filter cake was washed repeatedly with chloroform and then with acetone and dried in vacuum at 20° C, to give a composition which could be reduced in a hydrogen flow at 400° C to yield a nickel-on-silica catalyst.

EXAMPLE 8

To a stirred suspension of 20 g of a spheric amorphous silica having a specific surface of 200 m$^2$/g in 250 ml of distilled water were added successively a solution of 30 g of nickel nitrate (Ni(NO$_3$)$_2$·6 H$_2$O) in 300 ml of water and 12 g αω-dodecyldiamine in 25 ml of chloroform. The suspension obtained was stirred vigorously for 30 minutes at room temperature, and the mixture was allowed to stand for about 15 minutes, After filtering the filter cake was washed repeatedly with chloroform and dried in vacuum at 20° C to yield a composition which could be reduced in a hydrogen flow at 350 C to give a nickel-on-silica catalyst.

EXAMPLE 9

To a stirred suspension of 20 g of a spheric amorphous silica having a specific surface of 200 m$^2$/g in 250 ml of distilled water were added successively a solution of 30 g of nickel nitrate (Ni(NO$_3$)$_2$·6 aH$_2$O) in 300 ml of water and 58.0 g dioctadecylamine in 2500 ml of chloroform. The suspension obtained was stirred vigorously for 30 minutes at room temperature and the mixture was allowed to stand for about 15 minutes. After filtering the filter cake was washed repeatedly with chloroform and dried in vacuum at 20° C to yield a composition having a nickel content of 18.4 percent which on reduction at 400° C in a hydrogen flow gave a nickel-on-silica catalyst.

EXAMPLE 10

To a stirred suspension of 20 g of a spheric amorphous silica having a specific surface of 200 m²/g in 250 ml of distilled water were added successively a solution of 30 g nickel nitrate (Ni(NO₃)₂·6 H₂O) in 300 ml of water and 48 g n-undecylamine in 2500 ml of chloroform. The suspension obtained was stirred vigorously for 30 minutes and the mixture was allowed to stand for about 15 minutes. After filtering the filter cake was washed repeatedly with chloroform and dried in vacuum at 20° C to yield a composition having a nickel content of about 18.0 percent, which on reduction in a hydrogen flow at 40 C gave a nickel-on-silica catalyst.

EXAMPLE 11

To a stirred suspension of 2 g of a spheric amorphous silica having a specific surface of 200 m²/g in a solution of 3 g nickel nitrate (Ni(NO₃)₂·6 H₂O) in 54 ml water were added 3,5 g n-octyl-amine.

After stirring the mixture for about 5 minutes the originally green-colored aqueous solution had turned slightly bluish possibly due to the formation of a small amount of a complex between the nickel salt and the amine. Water was added to the mixture until a total volume of about 500 ml was obtained, after which stirring was continued for another 5 minutes, resulting in a disappearance of the blue color. The mixture was filtered off and the filter cake was washed repeatedly with acetone and and dried to yield a composition which could be reduced in a hydrogen flow at 400° C to give a nickel-on-silica catalyst.

EXAMPLE 12

To a suspension of 2 g of a spheric amorphous silica having a specific surface of 200 m²/g in a solution of 3 g nickel nitrate (Ni(NO³)₂·6 H₂O) in 54 ml water was added a solution of 3.5 g n-octylamine in 50 ml benzene.

After vigorously stirring the mixture for about 5 minutes at room temperature the solid material was filtered off, washed repeatedly with acetone and then dried at a temperature of 20° C to yield a composition having a nickel content of about 18.1 percent. Reduction of this composition in a hydrogen flow at 300° C gave a nickel-on-silica catalyst having about the same properties as the catalyst prepared according to Example 5.

EXAMPLE 13

To a suspension of 2 g of a spheric amorphous silica having a specific surface of 200 m²/g in a solution of 3 g nickel nitrate (Ni(NO₃)₂·6 H₂O) in 54 ml water was added a solution of 3.5 g n-octylamine in 50 ml benzene. The whole was heated at 50° C and then stirred vigorously at this temperature for about 5 minutes. The solid material was then filtered off, washed with acetone and dried at 20° C to yield a composition which could be reduced at 400° C to give a nickel-on-silica catalyst.

EXAMPLE 14

The experiment described in Example I was repeated, except that the mixture was stirred at a temperature of 50° C. After cooling, the solid material was filtered off, washed repeatedly with acetone and dried at 20° C to yield a composition which could be reduced quantitatively in a hydrogen flow at 300° C , having about the same properties as that prepared according to Example I.

EXAMPLE 15

To a stirred suspension of 20 g of a spheric amorphous silica having a specific surface of 200 m²/g in a solution of 27 g of nickel sulphate (NiSO₄·6 H₂O) in 600 ml of water was added 100 ml Primene 81–R (a mixture of t-alkyl amines having 12 to 14 carbon atoms). The resulting mixture was stirred vigorously at room temperature for about 15 minutes and the mixture was allowed to stand for about 15 minutes. After filtering the filter cake was washed first repeatedly with water until no more sulphate-ions could be detected in the washwater. Thereafter the filter cake was washed with acetone and dried in vacuum at 20° C to give a composition having a nickel content of about 18.1 percent. This composition could be reduced quantitatively in a hydrogen flow at 300° C.

What is claimed is:

1. In a process for the preparation of a nickel-on-silica catalyst, in which the nickel is precipitated from an aqueous solution of a nickel salt in the form of nickel hydroxide on a silica containing carrier material suspended in the solution, after which the solid material is separated from the aqueous solution, if necessary washed and dried, and subsequently activated, the steps comprising preparing an aqueous solution of a nickel salt, adding thereto an organic base having a solubility no greater than that of n-octyl amine in said solution, and a silica-containing carrier material, intimately contacting said organic base and said carrier material in said solution, thereby withdrawing hydrogen ions from said nickel salt in contact with said carrier material and gradually increasing the pH of said solution, and precipitating nickel hydroxide on said carrier material.

2. A process as claimed in claim 1 in which the organic base is selected from primary and secondary alkyl amines containing in the alkyl groups a total of at least 8 carbon atoms.

3. A process as claimed in claim 2 in which the organic base comprises a mixture of t-alkyl amines, the t-alkyl groups of which contain 12 to 14 carbon atoms.

4. A process as claimed in claim 2 in which the organic basee comprises a mixture of t-alkyl amines, the t-alkyl groups of which contain contain 18 to 22 carbon atoms.

5. A process as claimed in claim 1 in which the organic base is dissolved in an organic solvent that is substantially insoluble in the aqueous salt solution and that does not react with it under the reaction conditions employed.

6. A process as claimed in claim 5 in which the solvent comprises chloroform.

7. A process as claimed in claim 1 in which the nickel salt comprises nickel sulphate and in which the concentration calculated as NiSO₄·6 H₂O in the aqueous solution is 1 to 5 percent by weight.

8. A process as claimed in claim 1 in which the silica containing carrier material comprises silica with a specific surface of 5 to 750 m²/g.

9. A process as claimed in claim 8 in which the silica has a significant part of its pores with a diameter of more than 25 A.

10. A process as claimed in claim 1 in which the solid material before drying is washed with a water miscible organic solvent having a boiling point below 100° C.

* * * * *